(12) United States Patent
Lepeska

(10) Patent No.: US 8,051,192 B2
(45) Date of Patent: Nov. 1, 2011

(54) METHODS AND SYSTEMS FOR PRESENTATION LAYER REDIRECTION FOR NETWORK OPTIMIZATION

(75) Inventor: Peter Lepeska, Boston, MA (US)

(73) Assignee: ViaSat, Inc., Carlsbad, CA (US)

( * ) Notice: Subject to any disclaimer, the term of this patent is extended or adjusted under 35 U.S.C. 154(b) by 347 days.

(21) Appl. No.: 12/248,256

(22) Filed: Oct. 9, 2008

(65) Prior Publication Data

US 2009/0094373 A1   Apr. 9, 2009

Related U.S. Application Data

(60) Provisional application No. 60/978,686, filed on Oct. 9, 2007.

(51) Int. Cl.
 *G06F 15/16* (2006.01)
(52) U.S. Cl. ........................ 709/230; 709/238
(58) Field of Classification Search .................. 709/223, 709/225–230, 238
See application file for complete search history.

(56) References Cited

U.S. PATENT DOCUMENTS

| | | | |
|---|---|---|---|
| 6,061,738 A * | 5/2000 | Osaku et al. ................. | 709/245 |
| 6,510,465 B1 * | 1/2003 | Bilansky et al. .............. | 709/227 |
| 6,785,760 B2 * | 8/2004 | Asselin ........................ | 710/315 |
| 6,889,227 B1 * | 5/2005 | Hamilton .............................. | 1/1 |
| 7,376,695 B2 * | 5/2008 | Duursma et al. .............. | 709/203 |
| 2002/0188616 A1 * | 12/2002 | Chinnici et al. .............. | 707/102 |
| 2003/0142352 A1 * | 7/2003 | Matsunaga et al. ........... | 358/1.15 |
| 2004/0243742 A1 * | 12/2004 | Bragagnini et al. .............. | 710/33 |
| 2007/0288623 A1 * | 12/2007 | Kato et al. ..................... | 709/223 |
| 2008/0045234 A1 * | 2/2008 | Reed ........................... | 455/456.1 |
| 2008/0163185 A1 * | 7/2008 | Goodman ..................... | 717/151 |
| 2008/0225010 A1 * | 9/2008 | Wang ........................... | 345/173 |
| 2009/0288105 A1 * | 11/2009 | Wookey ....................... | 719/328 |

* cited by examiner

*Primary Examiner* — Faruk Hamza
(74) *Attorney, Agent, or Firm* — Kilpatrick Townsend & Stockton LLP

(57) ABSTRACT

The present invention relates to systems, apparatus, and methods of intercepting commands at an application presentation layer. The method includes intercepting, at a proxy client, a command issued by an application to a network resource before the command is converted into a corresponding protocol command. The method further includes forwarding a simplified command of the corresponding protocol command to a proxy server, and converting, at the proxy server, the simplified command into the corresponding protocol command. Further, the method includes transmitting the corresponding protocol command to the network resource and receiving a response from the network resource, such that, the response corresponds to the protocol. The method further includes transmitting a confirmation message to the proxy client upon completion of the corresponding protocol command and transmitting the confirmation message to the application.

19 Claims, 6 Drawing Sheets

METHODS AND SYSTEMS FOR PRESENTATION LAYER REDIRECTION FOR NETWORK OPTIMIZATION

PRIORITY CLAIM

This application claims priority of U.S. Provisional Application Ser. No. 60/978,686, filed on Oct. 9, 2007, entitled PRESENTATION LAYER REDIRECTION FOR NETWORK OPTIMIZATION, which in incorporated by reference in its entirety for any and all purposes.

FIELD OF THE INVENTION

The present invention relates, in general, to network acceleration and, more particularly, to presentation layer redirection.

BACKGROUND

Presently, in order to optimize network traffic, the individual commands being transmitted must be captured and an attempt to predict the user's action must be made. Unfortunately, often times a single command made by the user can show up across the network as many individual commands. For example, if the user clicks on a folder stored on a file server and deletes that folder, even though the user only executed one command, the network traffic would include a delete command for each file within the folder. Therefore, because of the delete commands for each file, it is difficult to determine that the user was simply deleting a folder. Hence, improvements in the art are needed.

BRIEF SUMMARY

Embodiments of the present invention are directed to a method of intercepting commands at an application presentation layer. The method includes intercepting, at a proxy client, a command issued by an application to a network resource before the command is converted into a corresponding protocol command. The method further includes forwarding a simplified command of the corresponding protocol command to a proxy server, and converting, at the proxy server, the simplified command into the corresponding protocol command. Further, the method includes transmitting the corresponding protocol command to the network resource and receiving a response from the network resource, such that, the response corresponds to the protocol. The method further includes transmitting a confirmation message to the proxy client upon completion of the corresponding protocol command and transmitting the confirmation message to the application.

According to a further embodiment, a system for intercepting commands at an application presentation layer is described. The system includes a client system which includes a proxy client. The proxy client is configured to intercept a command issued by an application to a network resource before the command is converted into a corresponding protocol command and forward a simplified command of the corresponding protocol command. The system further includes a proxy server connected with the client system via the client proxy. The proxy server is configured to convert the simplified command into the corresponding protocol command and transmit the corresponding protocol command to the network resource.

The system further includes a content server connected with the proxy server. The content server is configured to generate a response, such that the response corresponds to the protocol. The proxy client is further configured to transmit a confirmation message to the proxy client upon completion of the corresponding protocol command, and the proxy client is further configured to transmit the confirmation message to the application.

In an alternative embodiment, a machine-readable medium for intercepting commands at an application presentation layer. The machine-readable medium includes instructions for intercepting, at a proxy client, a command issued by an application to a network resource before the command is converted into a corresponding protocol command. The machine-readable medium further includes instructions for forwarding a simplified command of the corresponding protocol command to a proxy server, and converting, at the proxy server, the simplified command into the corresponding protocol command. Further, the machine-readable medium includes instructions for transmitting the corresponding protocol command to the network resource and receiving a response from the network resource, such that, the response corresponds to the protocol. The machine-readable medium further includes instructions for transmitting a confirmation message to the proxy client upon completion of the corresponding protocol command and transmitting the confirmation message to the application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It should be understood that various changes may be made in the function and arrangement of elements without departing from the spirit and scope as set forth in the appended claims.

Aspects of the disclosure relate to optimizing network traffic by intercepting network commands from a user at an application presentation layer. For example, when the user executes a file delete command in a graphical user interface (GUI) environment the command may be intercepted before being transmitted across the network. The command may then be optimized in order to conserve network resources. By intercepting the command at the application presentation layer (e.g., the GUI) the exact command can be known before being executed, thus improving optimization. Intercepting commands at the application presentation layer allows for the capturing of user interactions at the highest level. Alternatively, the command may be an open command, a move command, a rename command, a lock command, a directory view command, a folder create command, etc. (i.e., any known commands in the art).

Figure 1:
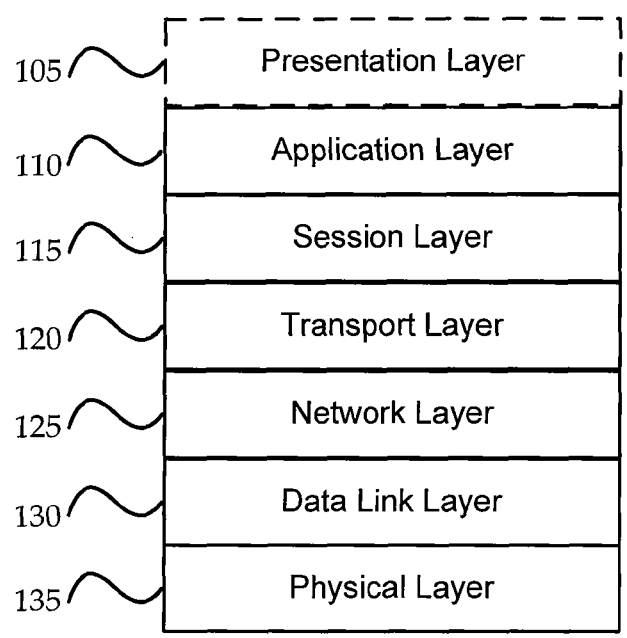
FIG. 1 is a block diagram illustrating a protocol stack, according to embodiments of the present invention.

Turning now to FIG. 1 which illustrates an open systems interconnect (OSI) model 100 according to aspects of the present invention. In one embodiment, OSI model 100 includes layers 105-135. Presentation layer 105 may correspond to the graphical user interface (GUI). For example, presentation layer 105 may be Microsoft Windows Explorer™ or an equivalent file manager. In an alternative embodiment, presentation layer 105 may be a GUI (or front-end) to multiple application types (e.g., a file server interface, a file transfer protocol (FTP) interface, an HTTP interface, a UNIX™ interface, etc.). Accordingly, the GUI may provide for optimization of a variety of network traffic types.

Application layer 110 may interface with applications and/or protocols associated with application and perform application services for the application processes. Session layer 115 may control dialogues/connections (sessions) between computers, and establish, manage and terminate connections between local and remote applications. Transport layer 120 may provide transparent transfer of data between end users and provide reliable data transfer services to the upper layers (i.e., presentation layer 105, application layer 110, session layer 115).

In one embodiment, network layer 125 may provide functional and procedural means of transferring variable length data sequences from a source to a destination via one or more networks while maintaining quality of service requested by transport layer 120. Data link layer 130 may provide functional and procedural means to transfer data between network entities and to detect and correct errors that may occur in physical layer 135. Physical layer 135 may include electrical and physical specifications for devices. Furthermore, physical layer 135 may define relationships between devices and physical mediums.

Figure 2:
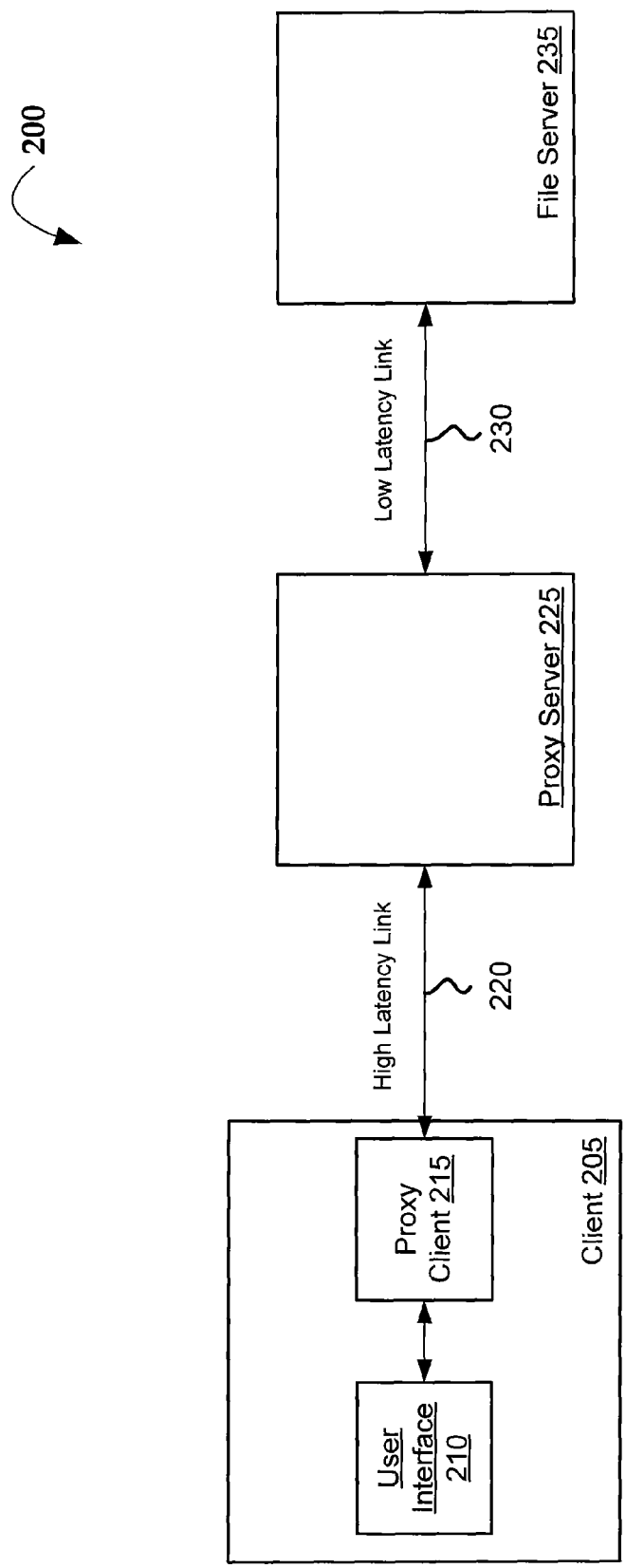
FIG. 2 is a block diagram illustrating a system for implementing presentation layer redirection, according to embodiments of the present invention.

Turning now to FIG. 2 which illustrates one embodiment of a network 200 according to aspects of the present invention. In one embodiment, network 200 may include a client 205. Client 205 may further include user interface 210 and proxy client 215. Client 205 may be, for example, a personal computer, a laptop computer, a portable computer, a handheld device, a mobile device, etc. In one embodiment, user interface 210 may be, for example, an operating system interface (e.g., Windows™, UNIX™, Linux™, O/S 10™, etc.), an application interface (e.g., a web browser, an FTP client, a database interface, file server interface, etc.), or a mobile platform (Windows CE™, Windows Mobile™, Palm O/S™, etc.). In one embodiment, user interface 210 may emulate Windows Explorer™ by using Windows™ namespace extension or Microsoft™ Webfolders™ technology.

In one embodiment, user interface 210 may be coupled with proxy client 215. Proxy client 215 may be configured to receive the commands intercepted at user interface 210. Upon receipt of the intercepted commands, proxy client 215 may be configured to modify the commands into a "simplified and/or modified" command format. For example, a standard "delete folder" command issued to a file server may consist of a separate delete command for each file within the folder and a separate delete confirmation for each file, each of which are transferred across the network connection. Having all those commands transmitted across the network connection causes an increase in the network traffic. This can be particularly troublesome for high latency and/or low bandwidth links (e.g., high latency link 220).

In a further embodiment, any user interactions at the presentation layer may be intercepted and/or captured. For example, keystrokes, mouse locations, mouse clicks, touch screen interactions, microphone input, stylus clicks and/or drags, etc. may be captured and/or intercepted. Essentially, any possible way in which the user can interact with a computing system (e.g., client 205) through the presentation layer, such information can be captured and utilized to determine the user's intentions. Such presentation layer information allows system 200 to be made aware of the user's intentions at the highest level. Hence, system 200 is able to optimize those intended commands before they are transmitted across the transmission medium. Accordingly, system 200 is able to transmit accelerated optimized commands by gathering information about the user's intentions at the highest level possible (i.e., the presentation layer though "high-level verps") without making any changes to the UI of client 205.

In one embodiment, in order to minimize the amount of traffic across a network connection (e.g., high latency link 220), proxy client 215 may modify the standard "delete folder", or other such command into a "simplified" command. Such a "simplified and/or modified" command may consist of transmitting a single "delete" command for the entire folder across high latency link 220. Thus, the amount of traffic across high latency link 220 may be significantly decreased. In addition, because proxy client 215 is now able to issue modified commands, proxy client 215 can optimize (e.g., compress the commands, use proprietary transport protocols, buffer commands, etc.) the commands independent from specific protocol requirements. Additional benefits of proxy client 215 being able to issue modified commands may be connection persistence (e.g., the ability to keep TCP connections open indefinitely) and automatic restarts (e.g., when transferring a file over an FTP connection and the transfer errors in the middle of the transfer).

In one embodiment, the modified command transmitted by proxy client 215 across high latency link 220 may be received by proxy server 225. In a further embodiment, proxy server 225 may be connected with file server 235 (or FTP server, HTTP server, etc.) via low latency link 230. In one embodiment, in order for proxy server 225 to be able to properly communicate with file server 235, the modified command would be translated into the "standard" (e.g., multiple delete commands to delete a single folder) format or protocol specific format. As such, proxy server 225 may translate the modified command into the "standard" command format before transmitting it to file server 235 over low latency link 230. As a result, it appears to file server 235 that the command was never modified, and file server 235 simply responds to proxy server 225 as if no modification has occurred. However, once proxy server 225 receives confirmation from file server 235 that the command has been completed, proxy server 225 may simply transmit a single confirmation message to proxy client 215 indicating that the command has been completed.

As such, the traffic over high latency link 220 is significantly reduced, while file server 235 believes that no modification of the commands has occurred.

In addition to reducing traffic over high latency link 220 application presentation layer interception also allows for centralized protocol updates. For example, since proxy server 225 manages protocol specific communications, any updates and/or changes to protocols only need to be made at proxy server 225, whereas without proxy server 225 each client would be required to update each protocol individually. Stated differently, client 205 only communicates with one protocol (i.e., proxy server 225's protocol) and so client 205 is completely agnostic to individual protocols and proxy server 225 handles the various protocol specific communications. As such, client 205 may include a universal data accessor user interface which may be a "front-end" for the proxy server 225. In one embodiment, the universal data accessor may be configured to intercept a wide range of commands associated with various protocols for which proxy server 225 includes modules. The modules may include, for example, file transfer module, FTP module, UNIX module, HTTP module, SMB module, etc. Such modules allow the universal data accessor to intercept such traffic at the user interface (or presentation layer) level and forward the traffic to the proxy server 225. Then, proxy server 225 may accept network traffic of any type to be optimized in which a module is included. Furthermore, in some embodiments, additional modules may be added to proxy server 225 in order to cover additional protocols. Consequently, the universal data accessor can then become a "one-size-fits-all" interface and proxy server 225 is able to handle multiple protocols. In a further embodiment, the universal data accessor may run on top of an operating system (i.e., when running on a personal computer) or may be an operating system itself (i.e., on a portable device).

Figure 3:
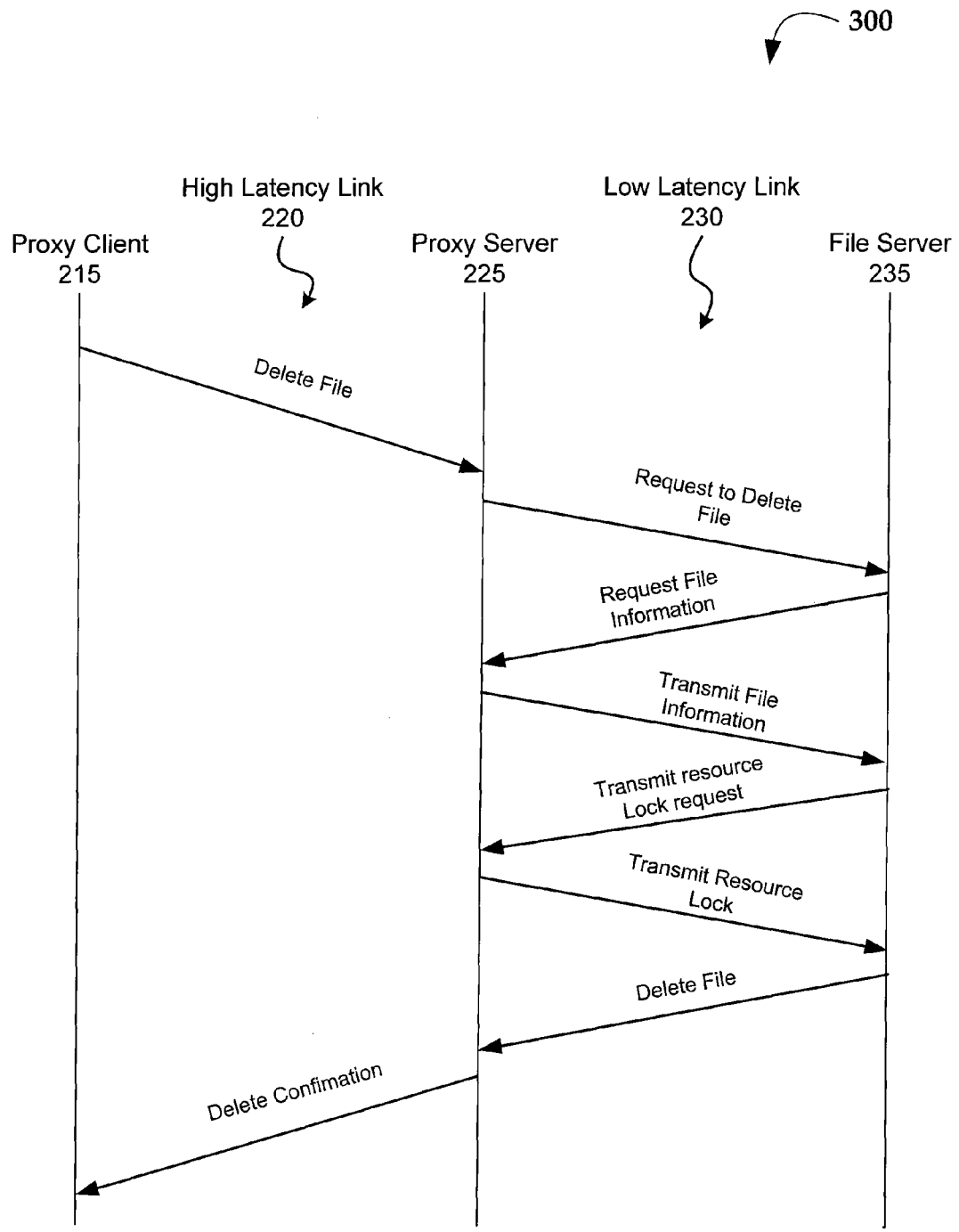
FIG. 3 is a time flow diagram illustrating presentation layer redirection, according to one embodiment of the present invention.

Turning now to FIG. 3 which illustrates a time flow diagram of communications which may be performed on network 200 (FIG. 2). In one embodiment, after a command is intercepted by user interface 210 (FIG. 2) and sent to proxy client 215, proxy client 215 may transmit a single command (i.e., delete file) over high latency link 220 to proxy server 225. Further, in order for proxy server 225 to communicate with file server 235, proxy server 225 may be configured to use file server 235's protocol (e.g., SMB protocol). According to file server 235's protocol a number of commands are transmitted between proxy server 225 and file server 235 over low latency link 230 (e.g., request to delete file, request file information, transmit file information, transmit resource lock request, transmit resource lock, delete file, etc.).

In one embodiment, once the commands between proxy server 225 and file server 235 are completed, proxy server 225 can transmit a single message to proxy client 215 confirming completion of the initial command (e.g., delete confirmation). Consequently, less traffic may be transmitted over high latency link 220 where bandwidth may be constrained, while file server 235 believes that all communications where carried out according to its specified protocol.

Figure 4:
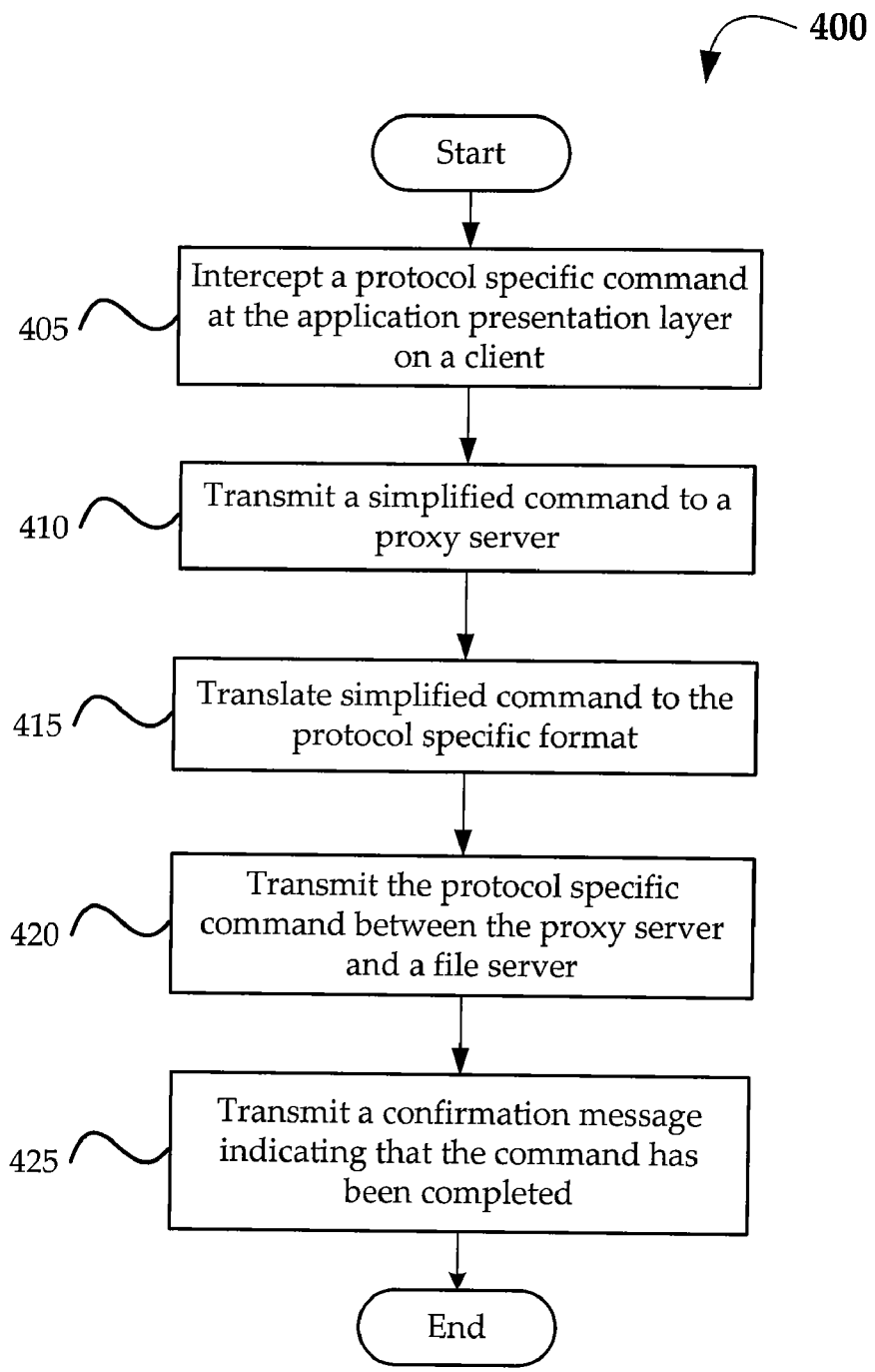
FIG. 4 is a flow diagram illustrating a method for implementing presentation layer redirection, according to one embodiment of the present invention.

Turning now to FIG. 4 which illustrates a flow diagram of a method 400 according to embodiments of the present invention. At process block 405, a command on a client system may be intercepted at the application presentation layer. The command may be configured for a specific protocol, which may depend on the destination of the command. The command may then be sent to a proxy client running on the client. At process block 410, the proxy client may convert the protocol specific command into a simplified or modified command, which can then be transmitted to a proxy server.

In one embodiment, the simplified and/or modified command may be optimized or may incorporate a proprietary protocol for increased speed and configurability. At process block 415, the simplified command may be translated back into the protocol specific command. At process block 420, the translated protocol specific command may be transmitted between the proxy server and the file server. In one embodiment, this protocol specific transaction may include a number of individual transactions in order to complete the command.

At process block 425, the proxy server may transmit a confirmation message to the proxy client confirming the completion of the command. Accordingly, in order to complete the command, only two transmissions between the client proxy and the server proxy are needed as opposed to the multiple commands that may be required by the specific protocol.

A number of variations and modifications of the disclosed embodiments can also be used. For example, file server 235 (FIG. 2) may be a web server, a database server, or any other acceptable server type. Furthermore, any number of protocols may be able to be handled by proxy server 225 (FIG. 2). As such, client 205 (FIG. 2) may only communicate with proxy server 225 (FIG. 2) using a single proprietary protocol.

Figure 5:
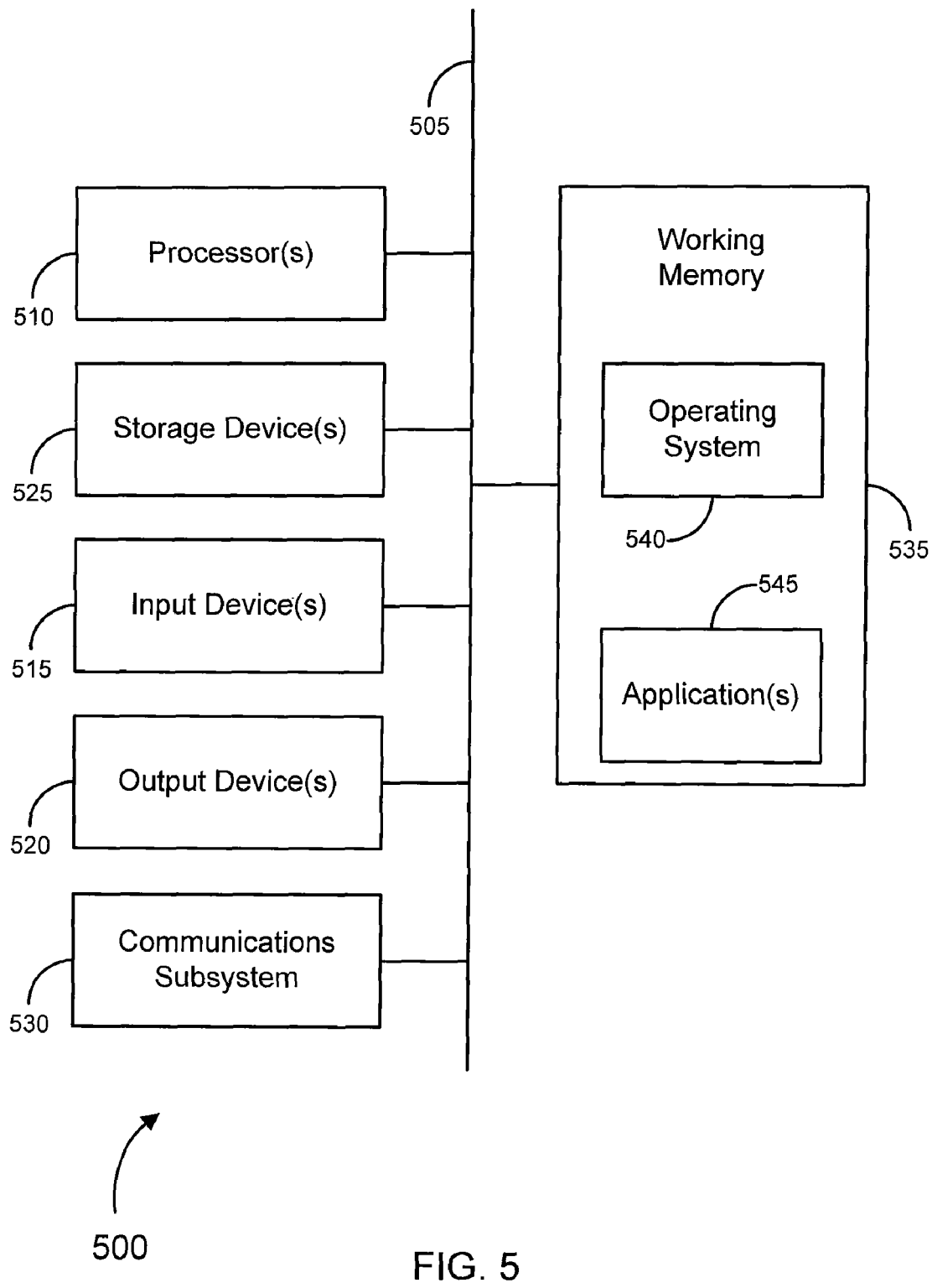
FIG. 5 is a generalized schematic diagram illustrating a computer system, in accordance with various embodiments of the invention.

FIG. 5 provides a schematic illustration of one embodiment of a computer system 500 that can perform the methods of the invention, as described herein, and/or can function, for example, as any part of client 205, proxy server 225, or file server 235 in FIG. 2. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
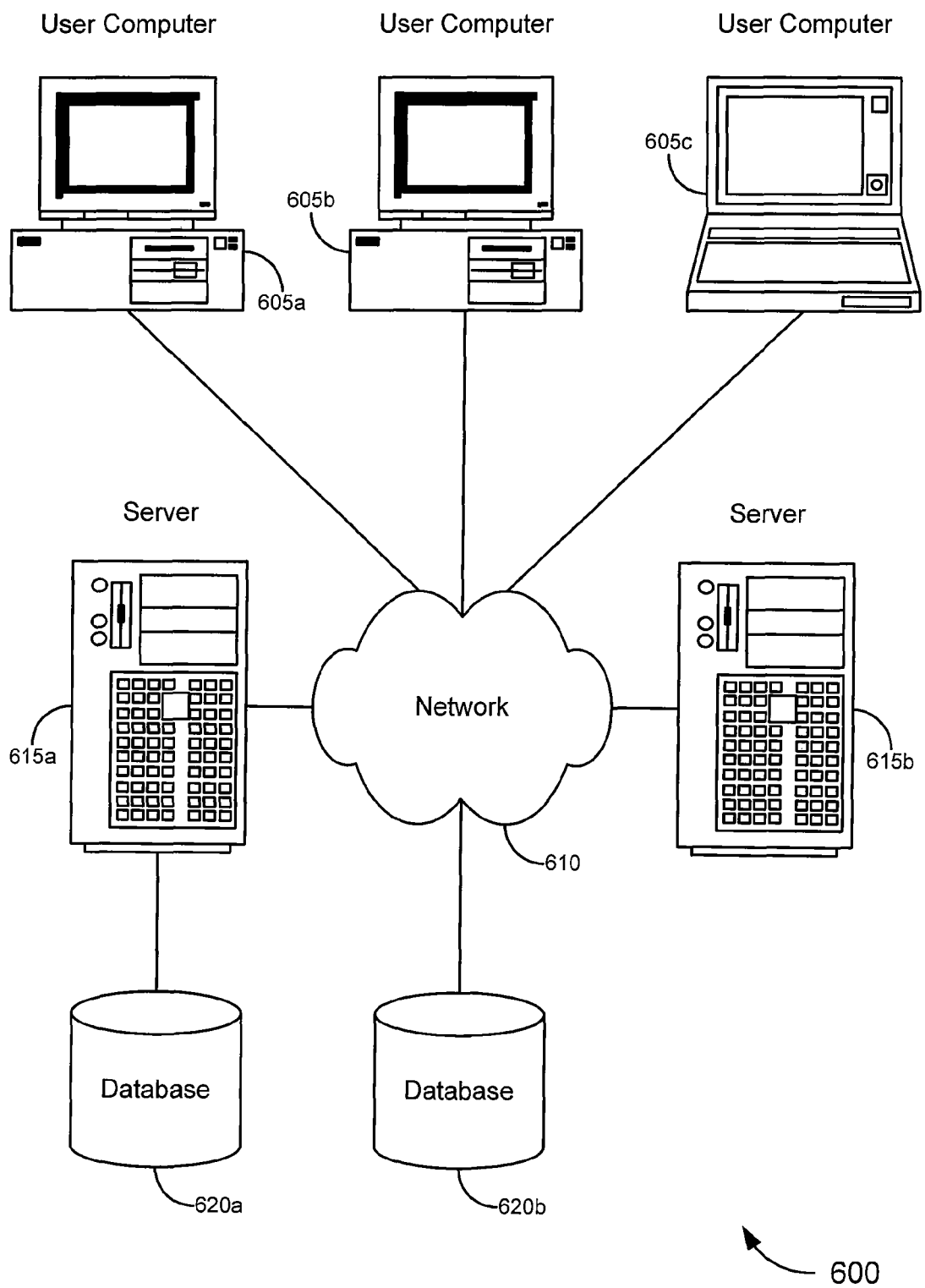
FIG. 6 is a block diagram illustrating a networked system of computers, which can be used in accordance with various embodiments of the invention.

A set of embodiments comprises systems for securely transmitting data between a client and a serve. In one embodiment, client 205, proxy server 225, or file server 235 may be implemented as computer system 600 in FIG. 6. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of intercepting commands at an application presentation layer, the method comprising:
   intercepting, at a user interface of a proxy client on a client computer system, a command issued to a standard network application server before the command is converted into a corresponding standard protocol command, wherein the intercepting of the command issued by the user interface is intercepted at the presentation layer of the protocol stack, and wherein the protocol stack comprises the Open Systems Interconnection Basic Reference (OSI) Model and the presentation layer is above the upper most layer of the protocol stack;
   forwarding a simplified command which corresponds to the standard protocol command to a proxy server computer;
   converting, at the proxy server computer, the simplified command into the standard corresponding protocol command;
   transmitting the corresponding standard protocol command to a network resource;
   receiving a response from the network resource, wherein the response corresponds to the standard protocol;
   transmitting a confirmation message to the proxy client upon completion of the corresponding protocol command using the simplified protocol; and
   transmitting a simplified response message to the user interface using the simplified protocol;
   wherein the corresponding standard protocol is selected from a plurality of standard protocols, the plurality of protocols comprise one or more of the following protocols: file transfer protocol (FTP), hyper text transfer protocol (HTTP), simple text transfer protocol (SMTP), transmission control protocol (TCP), user datagram protocol (UDP), Internet protocol (IP), and post office protocol version 3 (POP3).

2. The method of intercepting commands at an application presentation layer of claim 1, wherein the corresponding standard protocol is a server message block (SMB) protocol.

3. The method of intercepting commands at an application presentation layer of claim 2, wherein the command is one or more of the following SMB protocol commands: a delete command, an open command, a move command, a rename command, a lock command, a directory view command, and a folder create command.

4. The method of intercepting commands at an application presentation layer of claim 1, wherein the proxy client and the proxy server computer device are connected via a high latency link.

5. The method of intercepting commands at an application presentation layer of claim 1, wherein the proxy server computer device and the network resource are connected via a low latency link.

6. The method of intercepting commands at an application presentation layer of claim 4, wherein the high latency link is at least one of a wireless link, satellite link, cellular link, and a dial-up link.

7. The method of intercepting commands at an application presentation layer of claim 1, wherein the network resource is one or more of a file server, a file transfer protocol (FTP) server, a web server, and a database server.

8. The method of intercepting commands at an application presentation layer of claim 1, wherein the presentation layer is configured to directly receive user inputs from a user input device.

9. The method of intercepting commands at an application presentation layer of claim 8, wherein the user input device comprises one or more of the following: a mouse, a keyboard, a stylus, a touch screen, a microphone, and a trackball.

10. The method of intercepting commands at an application presentation layer of claim 1, the proxy client is executed on a client system computer device.

11. The method of intercepting commands at an application presentation layer of claim 10, wherein the presentation layer corresponds to the client system computer's user interface (UI).

12. The method of intercepting commands at an application presentation layer of claim 1, further comprising implementing an operating system (O/S) independent presentation layer UI.

13. The method of intercepting commands at an application presentation layer of claim 12, the O/S independent presentation layer UI is configured to intercept commands for the plurality of standard protocols and accelerate the commands.

14. A system for intercepting commands at an application presentation layer, the system comprising:
   a client computer device including a proxy client, wherein the proxy client is configured to intercept, at a user interface on the client computer device, a command issued to a standard network application server computer device before the command is converted into a corresponding protocol command and forward a simplified command which corresponds to the standard protocol command, wherein the intercepting of the command issued by the user interface is intercepted at the presentation layer of the protocol stack, and wherein the protocol stack comprises the Open Systems Interconnection Basic Reference (OSI) Model and the presentation layer is above the upper most layer of the protocol stack;
   a proxy server computer device connected with the client computer device via the client proxy, the proxy server computer device is configured to convert the simplified command into the corresponding standard protocol command and transmit the corresponding standard protocol command to a network resource;
   the standard network application server computer device connected with the proxy server computer device, the content server computer device is configured to generate a response, wherein the response corresponds to the standard protocol;
   wherein the proxy client is further configured to transmit a confirmation message to the proxy client upon completion of the corresponding protocol command using the simplified protocol; and
   wherein the proxy client is further configured to transmit a simplified protocol message to the user interface using the simplified protocol;
   wherein the corresponding standard protocol is selected from a plurality of standard protocols, the plurality of protocols comprise one or more of the following protocols: file transfer protocol (FTP), hyper text transfer protocol (HTTP), simple text transfer protocol (SMTP), transmission control protocol TCP), user datagram protocol (UDP), Internet protocol (IP), and post office protocol version 3 (POP3).

15. The system for intercepting commands at an application presentation layer of claim 14, wherein the client is connected with the proxy server computer device over a high latency link, and the proxy server computer device is connected with the content server over a low latency link.

16. The system for intercepting commands at an application presentation layer of claim 14, wherein the application comprises an operating system (O/S) independent presentation layer user interface (UI).

17. A non-transitory machine-readable medium for intercepting commands at an application presentation layer, the machine-readable medium including sets of instructions stored thereon which, when executed by a machine, cause the machine to:

intercept, at a user interface of a proxy client on a client computer system, a command issued to a standard network application server before the command is converted into a corresponding standard protocol command, wherein the intercepting of the command issued by the user interface is intercepted at the presentation layer of the protocol stack, and wherein the protocol stack comprises the Open Systems Interconnection Basic Reference (OSI) Model and the presentation layer is above the upper most layer of the protocol stack;

forward a simplified command which corresponds to the standard protocol command to a proxy server computer;

convert, at the proxy server computer, the simplified command into the standard corresponding protocol command;

transmit the corresponding standard protocol command to a network resource;

receive a response from the network resource, wherein the response corresponds to the standard protocol;

transmit a confirmation message to the proxy client upon completion of the corresponding protocol command using the simplified protocol; and transmit a simplified response message to the user interface using the simplified protocol;

wherein the corresponding standard protocol is selected from a plurality of standard protocols, the plurality of protocols comprise one or more of the following protocols: file transfer protocol (FTP), hyper text transfer protocol (HTTP), simple text transfer protocol (SMTP), transmission control protocol (TCP), user datagram protocol (UDP), Internet protocol (IP), and post office protocol version 3 (POP3).

18. The non-transitory machine-readable medium for intercepting commands at an application presentation layer of claim 17, wherein the intercepting of the command issued by the user interface is intercepted at the presentation layer of the protocol stack.

19. The non-transitory machine-readable medium for intercepting commands at an application presentation layer of claim 18, wherein the user interface comprises an operating system (O/S) independent presentation layer user interface.

* * * * *